United States Patent [19]

Geyer et al.

[11] 4,311,336
[45] Jan. 19, 1982

[54] WINDOW FRAME FOR PASSENGER VEHICLES

[75] Inventors: Ludwig Geyer, Puchheim; Franz Jarauch, Roehrmoos, both of Fed. Rep. of Germany

[73] Assignee: Maschinenfabrik Augsburg-Nuernberg Aktiengesellschaft, Munich, Fed. Rep. of Germany

[21] Appl. No.: 77,630

[22] Filed: Sep. 21, 1979

[30] Foreign Application Priority Data

Sep. 21, 1978 [DE] Fed. Rep. of Germany ....... 2841177

[51] Int. Cl.³ .............................................. B62D 25/02
[52] U.S. Cl. ...................................... 296/201; 52/397
[58] Field of Search ................... 296/201, 146, 84 D; 52/470, 773, 397, 461

[56] References Cited

U.S. PATENT DOCUMENTS

| | | | |
|---|---|---|---|
| 2,784,814 | 3/1957 | Bright | 52/461 |
| 3,323,471 | 6/1967 | Derow et al. | 296/201 |
| 3,387,416 | 6/1968 | Martin | 52/397 |
| 3,427,776 | 2/1969 | Lake et al. | 52/397 |
| 3,478,475 | 11/1969 | Strack | 52/397 |
| 4,093,304 | 6/1978 | Ziegler | 296/84 D |

FOREIGN PATENT DOCUMENTS 1102999 3/1961 Fed. Rep. of Germany ........ 52/461

*Primary Examiner*—Joseph F. Peters, Jr.
*Assistant Examiner*—Ross Weaver
*Attorney, Agent, or Firm*—Schwartz, Jeffery, Schwaab, Mack, Blumenthal & Koch

[57] ABSTRACT

Disclosed is a passenger vehicle, comprising a tubular metal frame, including two spaced vertical side members and an upper and a lower longitudinal member intersecting the vertical side members to define a window opening, at least the side members comprising a hollow cross-section and an integrally-formed bead portion projecting into the window opening; a pane of essentially transparent material positioned in the window opening and abutting against the bead portions; and an adhesive or other means for bonding the pane to the bead portions. The frame members may have a cross-section which is L-shaped, T-shaped or generally rectangular with an integrally formed protrusion.

10 Claims, 10 Drawing Figures

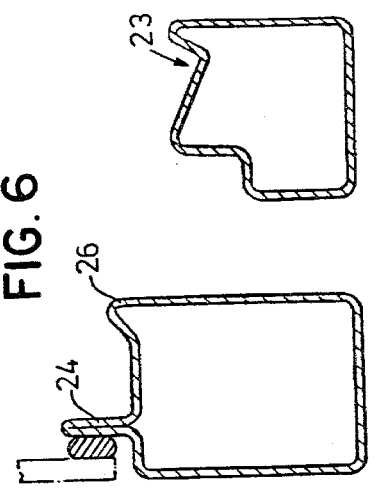
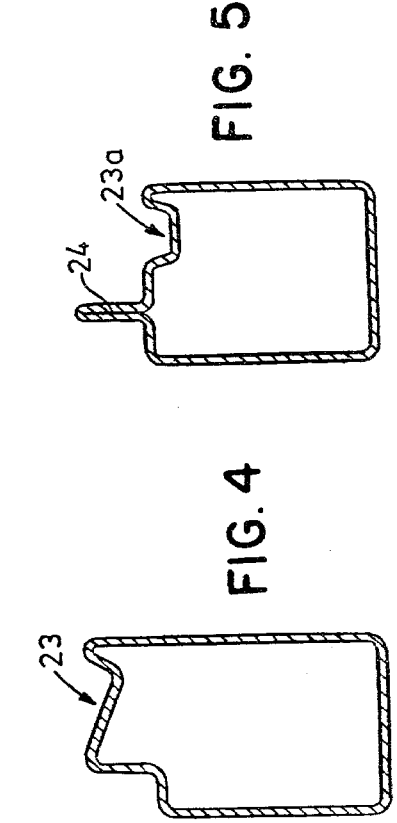
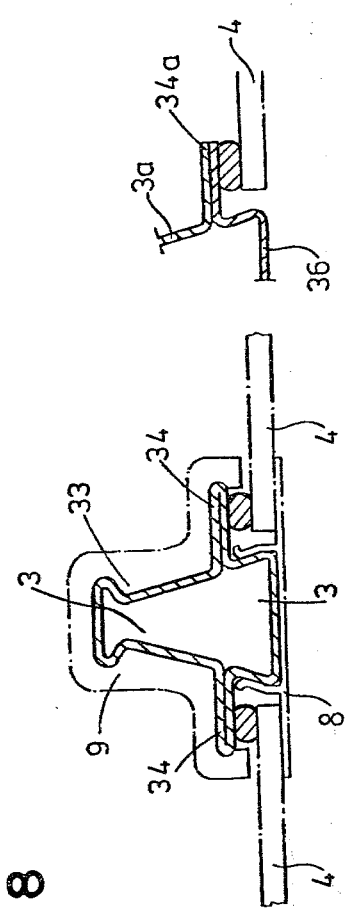
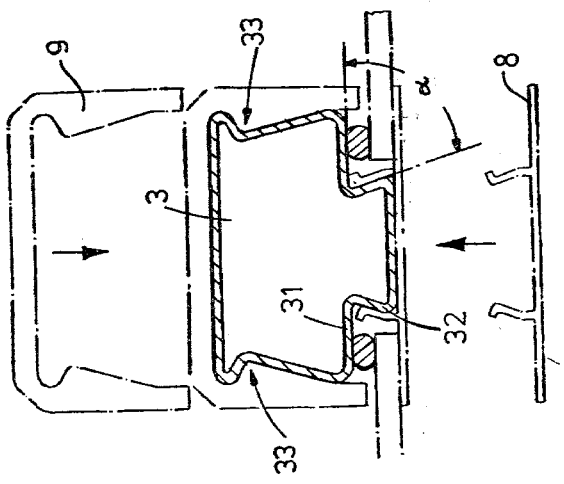

WINDOW FRAME FOR PASSENGER VEHICLES

BACKGROUND OF THE INVENTION

The present invention relates to an improved arrangement for bonding windows in a passenger vehicle and more especially to a passenger vehicle having a side wall comprising a tubular frame in which window frames formed by the vertical side beams and an upper and lower longitudinal member are provided for the attachment of windows which are to be bonded to the metal frame.

On conventional passenger vehicles of this type, in particular on omnibusses, the vertical side beams as well as the upper and lower longitudinal members consist of square tubes normally of rectangular cross-section. To provide abutment faces for the windows, angular sections are located on the outer surfaces of these square tubes and are conventionally spot-welded to them.

This known design of window frame for the bonding of windows has the disadvantage, among others, that the corrosion protective coating is degraded on both the angular sections and the square tube at the points where they are spot-welded, as a result of which a long-term degradation of the window frame is unavoidable.

Another disadvantage of this known frame design is that the spot-weld of the angular sections, which serve as the abutment frame for the window, to the square tubes does not provide sufficient rigidity. This results in an abutment surface for the windows which are to be bonded thereto which is not sufficiently planar. However, an important factor in the bonding of windows to the side walls of vehicles is absolute dimensional accuracy, in particular an absolutely planar configuration of the abutment faces, since the bond will transmit high thrust forces occurring between the tubular metal frame of the side wall and the windows. Great dimensional accuracy is also required because the windows have to be flush with the side wall surface along the entire window opening, an important factor for the streamlining of the vehicle side walls.

SUMMARY OF THE INVENTION

It is therefore an object of the present invention to provide an improved arrangement for bonding windows in a passenger vehicle.

Another object of this invention is to provide a passenger vehicle having absolutely planar, dimensionally accurate abutment faces for the windows, providing a high-strength connection to the tubular frame, while at the same time reducing the manufacturing investment for the window frame in comparison to the previously known design.

In accomplishing the foregoing objects, there has been provided in accordance with the present invention a passenger vehicle, comprising a tubular metal frame, including two spaced vertical side members and an upper and a lower longitudinal member intersecting the vertical side members to define a window opening, wherein at least the side members and preferably all four members comprise a hollow cross-section and an integrally-formed bead portion projecting into the window opening; a pane of essentially transparent material, preferably glass, positioned in the window opening and abutting against the bead portions; and means preferably in the form of an adhesive for bonding the pane to the bead portions. Preferably, the members comprise a generally L-shaped cross-section, wherein the foot portion forms said bead portion or a generally T-shaped cross-section, wherein each side of the T-cross piece forms a bead portion facing in opposite directions, or each of the members comprises a generally rectangular cross-section and the bead portion on each comprises an integrally formed protrusion projecting from one wall of the member. Alternatively, the members comprise two U-shaped channel members joined together at their rim portions to form the bead portions.

Further objects, features and advantages of the present invention will become apparent from the detailed description of preferred embodiments of the invention which follows, when considered together with the attached figures of drawing.

BRIEF DESCRIPTION OF THE DRAWINGS

In the drawings:

FIGS. 4, 5, 6 and 7 are cross-sectional views of different embodiments of hollow sections preferably used for the lower longitudinal members of the window frame shown in FIGS. 1 and 3; and FIGS. 8, 9 and 10 are cross-sectional views of different embodiments of hollow sections preferably used for the side beams of the window frame shown in FIGS. 1 and 2.

DETAILED DESCRIPTION OF PREFERRED EMBODIMENTS

Figure 1:
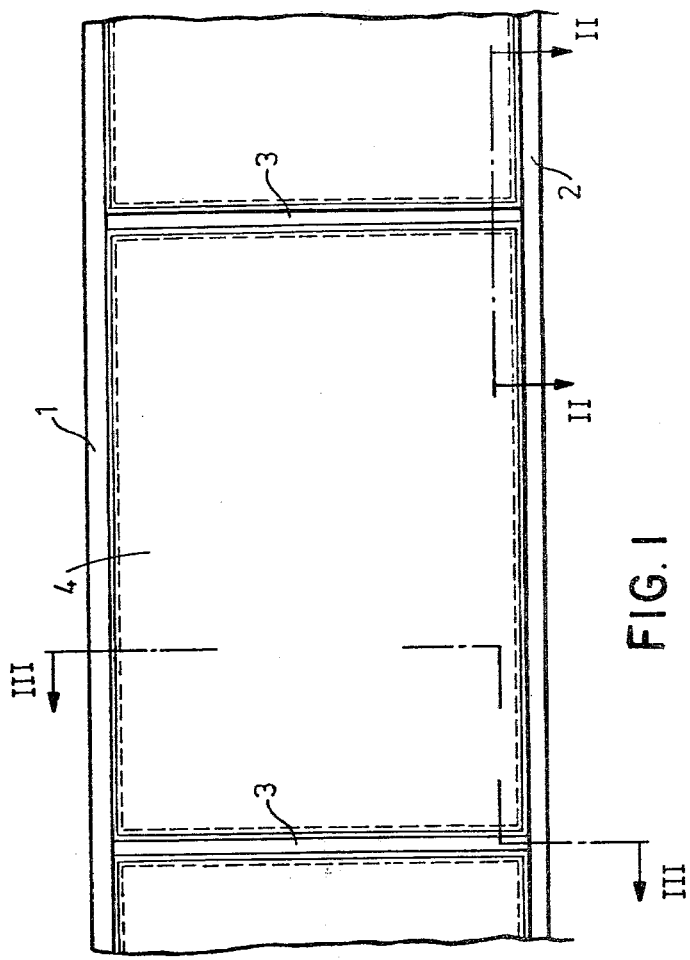
FIG. 1 is a plan view of a section of a side wall of a passenger vehicle with the windows arranged alongside each other.

According to the present invention, the vertical side beams and/or the longitudinal members are hollow sections with window beads integrally formed thereon. The window frame consequently need not be formed by a square tube to which a sectional member is welded or attached in any other way, but instead the applicable metal tube surrounding the window opening is suitably shaped to provide a window frame. The manufacture of such sections with beads integrally formed thereon is only slightly more expensive than the manufacture of square tubes, since extruded sections may be used. The advantages resulting in accordance with the present invention are considerable, however, because, on the one hand, any connection which may lead to corrosion is avoided and, on the other hand, absolute accuracy and high strength of the abutment faces for the windows are provided.

The latter characteristics are of particular significance for the application of adhesively bonded windows in passenger vehicles, since it is for precisely this reason that the windows are bonded to the tubular metal frame in order to use them as structural components for increasing the strength of the vehicle side wall.

L-shaped hollow sections and T-shaped hollow sections are particularly preferred for the side beams and longitudinal members, with the latter cross-section forming a window bead by each angular space between the web and flange. Therefore, the T-shaped hollow sections should be used preferably for frame components serving for the attachment of adjacent windows, either located alongside or above each other.

In a further preferred embodiment of the present invention, the side beams and/or the longitudinal members may also be square tubes with an integrally formed bead protruding from one tube wall toward the window opening.

It is particularly advantageous to use such hollow sections with protruding bead(s) for the longitudinal members and to use L- or T-shaped hollow sections for the side beams, since the side beams may be slotted deep enough at their lower and upper ends so that they may be fitted over the protruding beads on the upper and lower longitudinal members and be seated fully on the tube wall forming the bead. This will result in a smoothly contoured corner without seam openings between the longitudinal members and the side beams of the tubular metal frame.

In lieu of the T-shaped hollow section which provides two window beads, sections may be used which have two beads formed on opposite walls in symmetrical arrangement. A section of this type could be made from two U-shaped sections wherein the rims of each abut one another, thus forming the protruding beads. However, a hollow section of this type is less advantageous than an extruded section or any other integrally formed section with regard to the corrosion susceptibility mentioned above.

As regards the provision of window frame sections with two window beads, it may be advantageous that the sides of the beads form an angle ($\alpha$) smaller than 90° with the base. This indentation of the sides of the beads to the rear enables cover elements for the gaps between the window panes and the window frame to be attached by clips.

In a further embodiment of the present invention, notch-type depressions are formed on the opposite side walls of the side beams. These serve similarly for the clipping of cover elements, preferably made of plastic, such as polyurethane foam, to the inside of the passenger vehicle.

In a preferred embodiment of the present invention, notch-type depressions in the upper side wall of the lower longitudinal member and/or a bead protruding upwardly from the side wall plane are formed to provide water channels. This design, which can be realized without greater manufacturing investment compared to a common square section, has the advantage that water from condensation will not run via the side walls to the interior floor of the vehicle, but is instead immediately channelled into the window frame where it will evaporate owing to the heating inside the vehicle.

Various exemplary preferred embodiments and further details of the present invention are illustrated in the attached drawings. The section of a side wall of a bus illustrated in FIG. 1 shows an upper longitudinal member 1, a lower longitudinal member 2 and vertical side beams 3. The longitudinal members 1, 2 and the side beams 3 form a window frame to which a window pane 4 is bonded.

Figure 2:
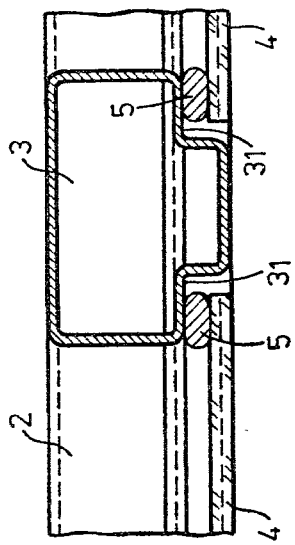
FIG. 2 is a cross-sectional view taken along line II—II in FIG. 1.

FIG. 2 illustrates the cross-section of the hollow section of one of the side beams 3. The lower longitudinal member is again designated by 2, and the window panes are designated by 4. The hollow section of the side beam in FIG. 2 is T-shaped, with each of the angular spaces between the T-base and the T-cross piece forming a window bead. Interlaid between each window pane 4 and the respective base 31 of each window bead is an adhesive layer. At the outer side, the windows are flush with the outer face of side beam 3, which forms the bottom plane of the T-shaped hollow section.

Further cross-sections corresponding to the cross-section in FIG. 2 are shown in FIGS. 8 and 9, and partly in FIG. 10. The cross-section of the side beam 3 according to FIG. 8 differs from the common T-section shown in FIG. 2 in that the sides 32 of the beads and the base 31 form an angle $\alpha$ of less than 90°.

This enables a clip-on type cover 8 for the gaps between the window panes 4 and the side beams 3 to be easily clipped onto the side beam, as shown in FIG. 8. Furthermore, the sectional profile of FIG. 8 differs from the section of FIG. 2 in that notch-type depressions 33 are formed on the opposite side walls of the side beam 3. This enables the side beam 3 to be covered at the vehicle inside wall by means of a flexible cover element 9 consisting of plastic, preferably a polyurethane foam.

In the cross-section according to FIG. 9, equivalent components are designated by the same reference numerals as in FIGS. 2 to 8. The cross-section of the side beam 3 in FIG. 9 differs from the cross-section according to FIG. 8 in that the window frames are formed by bead projections 34 protruding from the side walls of the side beam 3. These bead projections are formed integrally with the tubular section. The bead projections 34 are arranged symmetrically opposite to each other.

Finally, in FIG. 10, a cross-section corresponding to FIG. 9 is shown in which the side beam 3 consists of two members, namely the U-shaped sections 3a and 3b, the rims of which form the bead projections 34a. The U-shaped sections 3a and 3b are spot-welded at the seams which form the bead projections 34a.

Figure 3:
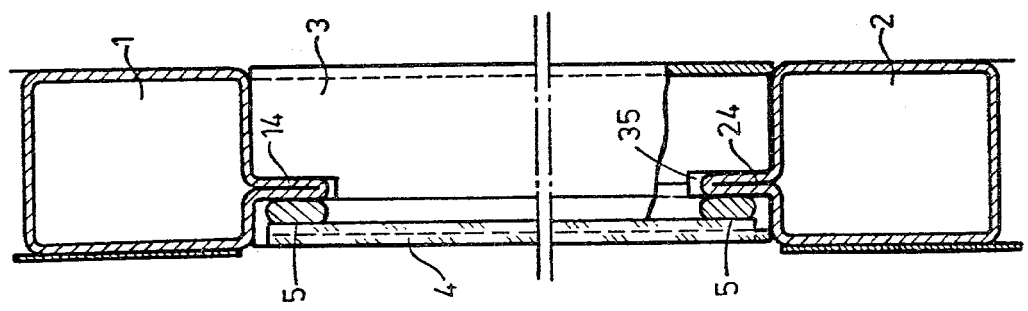
FIG. 3 is a cross-sectional view taken along line III—III in FIG. 1.

In the cross-section of FIG. 3, equivalent components are given the same reference numerals as in FIGS. 1 and 2. It is assumed that the side beam 3 has the hollow section shown in FIG. 2. Side beam 3 is slotted at each of its ends so that it may be fitted over the beads 14 and 24 of the upper and the lower longitudinal members. In lieu of the hollow cross-sections shown in FIG. 3, the hollow cross-sections shown in FIGS. 4 to 7 may alternatively be used. These cross-sections are particularly suitable for the lower longitudinal member as they are all provided with water channels, in that notch-type depressions 23, 23a are formed in the upper side wall or projections 26 are formed protruding upwardly from the plane of the upper side wall. The cross-sections according to FIGS. 4 and 7 are so-called L-shaped hollow cross-sections, the angular space of the L-section providing the window bead.

The cross-sections according to FIGS. 4 to 7 without exception may also be used for side beams, in particular, for those designed to carry a window pane only at one side, i.e., a single window or the end window in a row. Although the notch-type depressions 23, 23a or projections 26 are not required on the upper longitudinal members, the same sections can advantageously be used simultaneously for the upper and the lower longitudinal members.

Instead of a single window pane, a double window or an insulating window may also be used, in which case the depth of the bead must be adjusted to correspond to the thickness of the pane.

What is claimed is:

1. A passenger vehicle comprising a tubular metal frame comprising two spaced vertical side members, an upper longitudinal member and a lower longitudinal member, said upper and lower longitudinal members intersecting said vertical side members to define a window opening, said side members and said upper and lower longitudinal members each comprising a hollow cross-section and an integrally-formed bead portion in the form of a protrusion projecting from one wall of the member into said window opening, said bead members all lying in a common plane, the side of said bead portion forming an angle of less than 90° with the adjoining wall portion of said member; said vehicle further comprising a pane of essentially transparent material positioned in said window opening and abutting against said bead portion and an adhesive interposed between said pane and said bead portion for bonding said pane to said bead portion and a resilient cover member for covering a gap between the pane and one of said vertical or longitudinal members, resiliently engaged over the angular adjoining wall of one of said members.

2. A vehicle according to claim 1 wherein said pane comprises glass.

3. A vehicle according to claim 1 wherein each of said side members and said upper and lower longitudinal members comprises a generally rectangular hollow cross-section.

4. A passenger vehicle according to claim 1, wherein said bead portions have a depth such that said glass fits flush with the outside surface of said members.

5. A passenger vehicle according to claim 1, wherein at least two of said members comprise two of said protrusions projecting from opposite sides thereof.

6. A passenger vehicle according to claim 1, further comprising a notch-like groove formed in that side wall of said member from which said bead portion projects, said groove adapted to receive and hold a resilient cover member fitted over said member.

7. A passenger vehicle according to claim 6, wherein said groove is formed on opposing sides of each vertical side member.

8. A passenger vehicle according to claim 1, further comprising a channel formed in said lower longitudinal member for collecting moisture condensing on the surface of said glass plane facing inside of the vehicle.

9. A passenger vehicle according to claim 8, wherein said channel is formed by a depression in said lower longitudinal member.

10. A passenger vehicle according to claim 8, wherein said channel is formed by a projection protruding upwardly from said lower longitudinal member at a distance spaced from said pane.

* * * * *